(12) United States Patent
Theis et al.

(10) Patent No.: US 10,623,775 B1
(45) Date of Patent: Apr. 14, 2020

(54) END-TO-END VIDEO AND IMAGE COMPRESSION

(71) Applicant: Twitter, Inc., San Francisco, CA (US)

(72) Inventors: Lucas Theis, London (GB); Ferenc Huszar, London (GB); Zehan Wang, London (GB); Wenzhe Shi, London (GB)

(73) Assignee: Twitter, Inc., San Francisco, CA (US)

( * ) Notice: Subject to any disclaimer, the term of this patent is extended or adjusted under 35 U.S.C. 154(b) by 54 days.

(21) Appl. No.: 15/804,584

(22) Filed: Nov. 6, 2017

Related U.S. Application Data

(60) Provisional application No. 62/418,105, filed on Nov. 4, 2016, provisional application No. 62/462,233, filed on Feb. 22, 2017.

(51) Int. Cl.
*G06N 3/08* (2006.01)
*H04N 19/124* (2014.01)
*H04N 19/61* (2014.01)

(52) U.S. Cl.
CPC ........... *H04N 19/61* (2014.11); *G06N 3/088* (2013.01); *H04N 19/124* (2014.11)

(58) Field of Classification Search
CPC .............................. H04N 19/61; H04N 19/124
See application file for complete search history.

(56) References Cited

U.S. PATENT DOCUMENTS

| | | | | |
|---|---|---|---|---|
| 5,515,477 A | * | 5/1996 | Sutherland | G06K 9/6232 706/41 |
| 7,219,085 B2 | * | 5/2007 | Buck | G06N 3/08 706/12 |
| 7,352,298 B2 | * | 4/2008 | Monro | G06T 9/005 341/50 |
| 7,392,161 B2 | * | 6/2008 | Seger | G06N 3/02 702/189 |
| 8,223,837 B2 | * | 7/2012 | Sun | H04N 19/132 375/240.08 |

(Continued)

OTHER PUBLICATIONS

Andrews, et al., "Scale Mixtures of Normal Distributions", Journal of the Royal Statistical Society, Series B, vol. 36, No. 1, 1974, pp. 99-102.

(Continued)

*Primary Examiner* — Irfan Habib
(74) *Attorney, Agent, or Firm* — Brakes Hughes Bellermann LLP

(57) ABSTRACT

A system (e.g., an auto-encoder system) includes an encoder, a decoder and a learning module. The encoder generates compressed video data using a lossy compression algorithm, the lossy compression algorithm being implemented using a trained neural network with at least one convolution, generate at least one first parameter based on the compressed video data, and communicate the compressed video data and the model to at least one device configured to decode the compressed video data using an inverse algorithm based on the lossy compression algorithm. The decoder generates decoded video data based on the compressed video data using the inverse algorithm and the model, and generate at least one second parameter based on the decoded video data. The learning module trains the model using the at least one first parameter and the at least one second parameter.

20 Claims, 10 Drawing Sheets

(56) References Cited

U.S. PATENT DOCUMENTS

| | | | | |
|---|---|---|---|---|
| 8,363,967 | B2* | 1/2013 | Mim | H04N 19/176 382/233 |
| 8,880,446 | B2* | 11/2014 | Wellman | G06N 20/00 706/12 |
| 9,015,093 | B1* | 4/2015 | Commons | G01C 21/3602 706/26 |
| 9,041,723 | B2* | 5/2015 | Nystad | H04N 19/90 345/582 |
| 9,147,021 | B2* | 9/2015 | Chen | G06F 17/5036 |
| 9,213,936 | B2* | 12/2015 | Visel | G06F 17/271 |
| 9,218,574 | B2* | 12/2015 | Phillipps | G06N 20/00 |
| 9,280,723 | B2* | 3/2016 | Lerios | G06T 9/00 |
| 9,563,825 | B2* | 2/2017 | Shen | G06K 9/66 |
| 9,646,262 | B2* | 5/2017 | Phillipps | G06N 20/00 |
| 2002/0184272 | A1* | 12/2002 | Burges | H04N 19/105 708/203 |
| 2005/0114280 | A1* | 5/2005 | Rising, III | G06N 3/0454 706/25 |
| 2007/0248272 | A1* | 10/2007 | Sun | H04N 19/61 382/239 |
| 2009/0067491 | A1* | 3/2009 | Sun | H04N 19/132 375/240.03 |
| 2009/0110070 | A1* | 4/2009 | Takahashi | H04N 19/176 375/240.12 |
| 2010/0177891 | A1* | 7/2010 | Keidar | H04N 5/913 380/200 |
| 2011/0270604 | A1* | 11/2011 | Qi | G06F 17/271 704/9 |
| 2013/0182776 | A1* | 7/2013 | Zhang | H04N 19/176 375/240.24 |
| 2013/0321574 | A1* | 12/2013 | Zhang | H04N 19/597 348/43 |
| 2014/0029839 | A1* | 1/2014 | Mensink | G06K 9/6272 382/159 |
| 2014/0079297 | A1* | 3/2014 | Tadayon | G06K 9/00 382/118 |
| 2014/0241629 | A1* | 8/2014 | Lerios | G06T 9/00 382/166 |
| 2014/0301456 | A1* | 10/2014 | Wang | H04N 19/70 375/240.12 |
| 2016/0148078 | A1* | 5/2016 | Shen | G06K 9/66 382/158 |
| 2016/0189009 | A1* | 6/2016 | Tran | G06K 9/00744 382/158 |
| 2016/0292589 | A1* | 10/2016 | Taylor, Jr. | G06F 16/1744 |
| 2017/0132510 | A1* | 5/2017 | Paluri | G06N 3/08 |
| 2017/0185838 | A1* | 6/2017 | Johri | G06K 9/6253 |
| 2017/0230675 | A1* | 8/2017 | Wierstra | G06N 3/0454 |
| 2018/0018553 | A1* | 1/2018 | Bach | G06F 17/2765 |
| 2018/0075347 | A1* | 3/2018 | Alistarh | G06N 3/084 |
| 2018/0139458 | A1* | 5/2018 | Wang | H04N 19/33 |
| 2018/0176576 | A1* | 6/2018 | Rippel | H04N 19/126 |
| 2018/0239992 | A1* | 8/2018 | Chalfin | G06K 9/66 |
| 2018/0247227 | A1* | 8/2018 | Holtham | G06K 9/6215 |

OTHER PUBLICATIONS

Balle, et al., "End-to-end optimization of nonlinear transform codes for perceptual quality", Picture Coding Symposium, 2016, 5 pages.

Bruna, et al., "Super-resolution with deep convolutional sufficient statistics", The International Conference on Learning Representations, 2016, 17 pages.

Del Testa, et al., "Lightweight Lossy Compression of Biometric Patterns via Denoising Autoencoders", IEEE Signal Processing Letters, vol. 22, Issue 12, Dec. 2015, pp 2304-2308.

Dieleman, et al., "Lasagne: First release", retrieved from http://dx.doi.org/10.5281/zenodo.27878, 2015, 2 pages.

Dosovitskiy, et al., "Generating images with perceptual similarity metrics based on deep networks", retrieved from arXiv:1602.02644, Feb. 9, 2016, 14 pages.

Gatys, et al., "Image style transfer using convolutional neural networks", Proceedings of the IEEE Conference on Computer Vision and Pattern Recognition, 2016, pp. 2414-2423.

Goodfellow, et al., "Generative adversarial nets", Advances in Neural Information Processing Systems, vol. 27, 2014, 9 pages.

Gregor, et al., "Towards conceptual compression", retrieved from arXiv:1601.06759, Apr. 29, 2016, 14 pages.

He, et al., "Deep residual learning for image recognition", retrieved from arXiv:1512.03385, Dec. 10, 2015, 12 pages.

Kingma, et al., "Adam: A Method for Stochastic Optimization", International Conference on Learning Representations, 2015, 15 pages.

Laparra, et al., "Perceptual image quality assessment using a normalized Laplacian pyramid", Proc. IS&T Int'l Symposium on Electronic Imaging: Conf. on Human Vision and Electronic Imaging,, Feb. 14-18, 2016, 6 pages.

Ledig, et al., "Photo-Realistic Single Image Super-Resolution Using a Generative Adversarial Network", retrieved from https://arxiv.org/abs/1609.04802, 2016, 19 pages.

Ollivier, "Auto-encoders: reconstruction versus compression", retrieved from https://arxiv.org/abs/1403.7752, 2015, 24 pages.

Portilla, et al., "Image denoising using scale mixtures of gaussians in the wavelet domain", IEEE Transactions on Image Processing, vol. 12, No. 11, Nov. 2003, pp. 1338-1351.

Rumelhart, et al., "Learning representations by back-propagating errors", Nature, vol. 323, Oct. 1986, pp. 533-536.

Shi, et al., "Real-time single image and video super-resolution using an efficient sub-pixel convolutional neural network", IEEE Conf. on Computer Vision and Pattern Recognition, Sep. 23, 2016, 10 pages.

Skodras, et al., "The JPEG 2000 still image compression standard", Signal Processing Magazine, 18(5), Sep. 2001, pp. 36-58.

Theis, et al., "A note on the evaluation of generative models", The International Conference on Learning Representations, retrieved from https://arxiv.org/abs/1511.01844, 2016, 10 pages.

Theis, et al., "Generative Image Modeling Using Spatial LSTMs", Advances in Neural Information Processing Systems 28, 2015, 9 pages.

Toderici, et al., "Full resolution image compression with recurrent neural networks", retrieved from https://arxiv.org/abs/1608.05148, 59 pages.

Toderici, et al., "Variable rate image compression with recurrent neural networks", ICLR 2016, retrieved from https://arxiv.org/abs/1511.06085, 12 pages.

Van Den Oord, et al., "Conditional Image Generation with PixelCNN Decoders", retrieved from https://arxiv.org/abs/1606.05328, 2016, 13 pages.

Van Den Oord, et al., "Pixel recurrent neural networks", Proceedings of the 33rd International Conference on Machine Learning, retrieved from https://arxiv.org/abs/1601.06759, 2016, 11 pages.

Van Den Oord, et al., "The student-t mixture as a natural image patch prior with application to image compression", Journal of Machine Learning Research 15, 2014, pp. 2061-2086.

Van Der Walt, et al., "scikit-image: image processing in Python", PeerJ, 2, retrieved from https://arxiv.org/abs/1407.6245, 2014, 19 pages.

Wallace, "The JPEG still picture compression standard", Communications of the ACM, vol. 34, No. 4, Apr. 1991, pp. 30-44.

Wang, et al., "Image quality assessment: from error visibility to structural similarity", IEEE Transactions on Image Processing, vol. 13, No. 4,, Apr. 2004, 14 pages.

Wang, et al., "Multiscale structural similarity for image quality assessment", Proceedings of the 37th IEEE Asilomar Conference Signals, Systems and Computers, Nov. 2003, 5 pages.

Williams, "Simple statistical gradient-following algorithms for connectionist reinforcement learning", Machine Learning, 8, 1992, pp. 229-256.

* cited by examiner

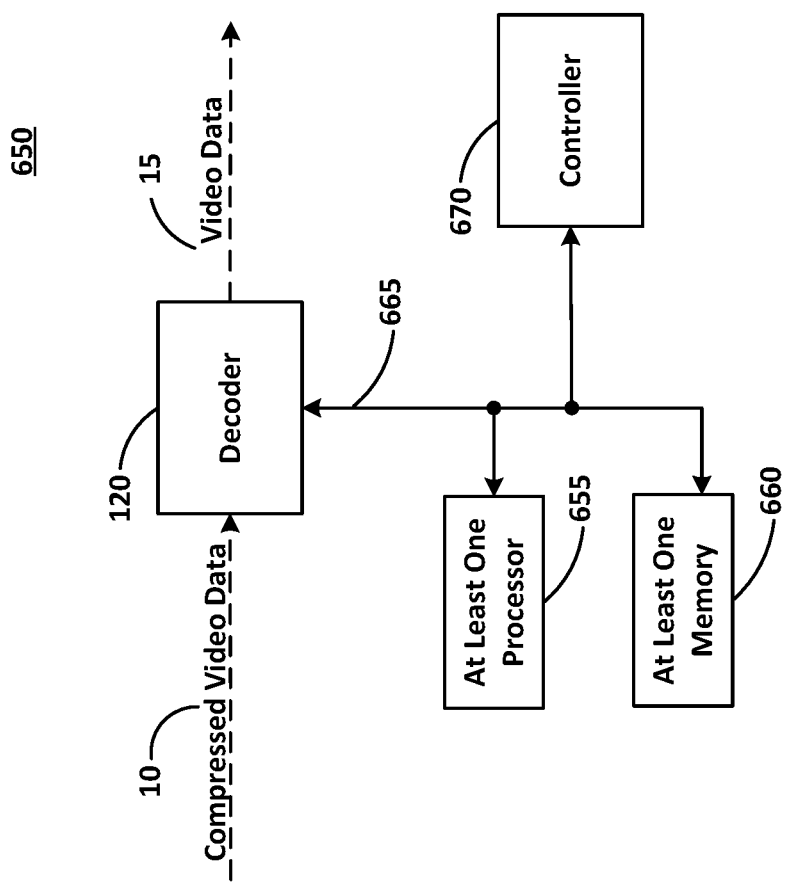

END-TO-END VIDEO AND IMAGE COMPRESSION

CROSS REFERENCE TO RELATED APPLICATIONS

This application claims the benefit of U.S. Application Ser. No. 62/418,105, filed on Nov. 4, 2016, titled "Lossy Image Compression Using Compressive Autoencoders," and U.S. Application Ser. No. 62/462,233, filed on Feb. 22, 2017, titled "End-To-End Video Compression," each of which is incorporated herein by reference in its entirety.

FIELD

Embodiments relate to using neural networks in lossy image compression

BACKGROUND

Commonly used video compression techniques, such as H.264 and VP8, as well as proposed techniques, such as H.265, HEVC and VP9, all generally use similar approaches and families of compression techniques. These compression techniques make a trade-off between the quality and the bit-rate of video data streams when providing inter-frame and intra-frame compression, but the amount of compression possible is largely dependent on the image resolution of each frame and the complexity of the image sequences. To illustrate the relationship between bitrate and resolution among other factors, it is possible to use an empirically-derived formula to show how the bitrate of a video encoded with, for example the H.264 compression technique, relates to the resolution of that video:

$$\text{bitrate} \propto Q \times w \times h \times f \times m \quad (1)$$

where Q is a quality constant, w is the width of a video, h is the height of the video, f is the frame-rate of the video and m is the motion rank, where $m \in \{1, \ldots, 4\}$ and a higher m is used for fast-changing, hard-to-predict content. For images, $f=1$ and $m=1$.

Equation (1) illustrates the direct relationship between the bitrate and the quality constant Q. A typical value, for example, could be selected for Q based on published empirical data, but a significant amount of research is directed to optimizing a value for Q. Equation (1) also illustrates the direct relationship between the bitrate and the complexity of the image sequences, i.e. variable m. The aforementioned existing video codecs focus on spatial and temporal compression techniques. Proposed video compression techniques, such as H.265, HEVC and VP9, seek to improve upon the motion prediction and intra-frame compression of previous techniques, e.g., by optimizing a value for m.

Equation (1) further illustrates a direct relationship between the bitrate and the resolution of the video, i.e. variables w and h. In order to reduce the resolution of video, several techniques exist to downscale the resolution of video data to reduce the bitrate. As a result of the disadvantages of current compression approaches, existing network infrastructure and video streaming mechanisms are becoming increasingly inadequate to deliver large volumes of high quality video content to meet ever-growing consumer demands for this type of content. This can be of particular relevance in certain circumstances, for example in relation to live broadcasts, where bandwidth is often limited, and extensive processing and video compression cannot take place at the location of the live broadcast without a significant delay due to inadequate computing resources being available at the location. Advances in training of neural networks have helped to improve performance in a number of domains. However, neural networks have yet to surpass existing codecs in lossy image compression.

SUMMARY

Example embodiments describe systems and methods to compress image or video data using lossy image compression algorithms based on neural networks.

In a general aspect, a system (e.g., an auto-encoder system) includes an encoder, a decoder and a learning module. The encoder is configured to generate compressed video data using a lossy compression algorithm, the lossy compression algorithm being implemented using a trained neural network with at least one convolution, generating at least one first parameter based on the compressed video data, and communicating the compressed video data and the model to at least one device configured to decode the compressed video data using an inverse algorithm based on the lossy compression algorithm. The decoder is configured to generate decoded video data based on the compressed video data using the inverse algorithm and the model, and generate at least one second parameter based on the decoded video data. The learning module is configured to train the model using the at least one first parameter and the at least one second parameter.

In another general aspect, a method includes generating first compressed video data using a lossy compression algorithm, the lossy compression algorithm being implemented using at least one convolution having a model trained using a neural network, generating at least one first parameter based on the compressed video data, communicating the compressed video data and the model to at least one device configured to decode the compressed video data using an inverse algorithm based on the lossy compression algorithm, generating decoded video data based on the compressed video data using the inverse algorithm and the model, generating at least one second parameter based on the decoded video data, training the model using the at least one first parameter and the at least one second parameter, and generating second compressed video data using the trained model.

In yet another general aspect, a non-transitory computer readable medium includes code segments that when executed by a processor cause the processor to perform steps including to generate first compressed video data using a lossy compression algorithm, the lossy compression algorithm being implemented using at least one convolution having a model trained using a neural network, generate at least one first parameter based on the compressed video data, communicate the compressed video data and the model to at least one device configured to decode the compressed video data using an inverse algorithm based on the lossy compression algorithm, generate decoded video data based on the compressed video data using the inverse algorithm and the model, generate at least one second parameter based on the decoded video data, train the model using the at least one first parameter and the at least one second parameter, and generate second compressed video data using the trained model.

Implementations can include one or more of the following features. For example, the compressed video data can be quantized using rounding. The compressed video data can be downsampled using a stride in a convolution. The compressed video data can be upsampled using zero-padding and reorganization of coefficients in a mask used in a convolution. A continuous, differentiable approximation of a probability distribution can be used to assign a number of bits to a representation based on a frequency of the representation. An Independent Gaussian scale mixture (GSM) can be used to model a distribution of coefficients and to estimate a bit rate for the model. Model coefficients associated with the model can be trained using incremental training, and the incremental training can use a binary mask. Model coefficients associated with the model correspond to elements in a mask can be used in a convolution. The method or steps can further include at least one of performing intra-frame prediction on input video data and performing inter-frame prediction on the input video data. The model can be selected based on a type of image or video to be encoded.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 6B illustrates a block diagram of an auto-decoder system according to at least one example embodiment.

It should be noted that these Figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Auto-encoders have the potential to address an increasing need for flexible lossy compression algorithms. When sending data from a server to a computing device, e.g., a mobile computing device, pairing a powerful encoder with a less complex decoder may be desirable. The requirements could be reversed when sending data in the other direction. The amount of computational resources and bandwidth available may change over time as new technologies become available. For the purpose of archiving, encoding and decoding times matter less than for streaming applications. Further, existing compression algorithms may be far from optimal for new media formats such as lightfield images, 360 video or VR content. While the development of a new codec can take years, a more general compression framework based on neural networks may adapt much more quickly to these changing tasks and environments.

Figure 1:
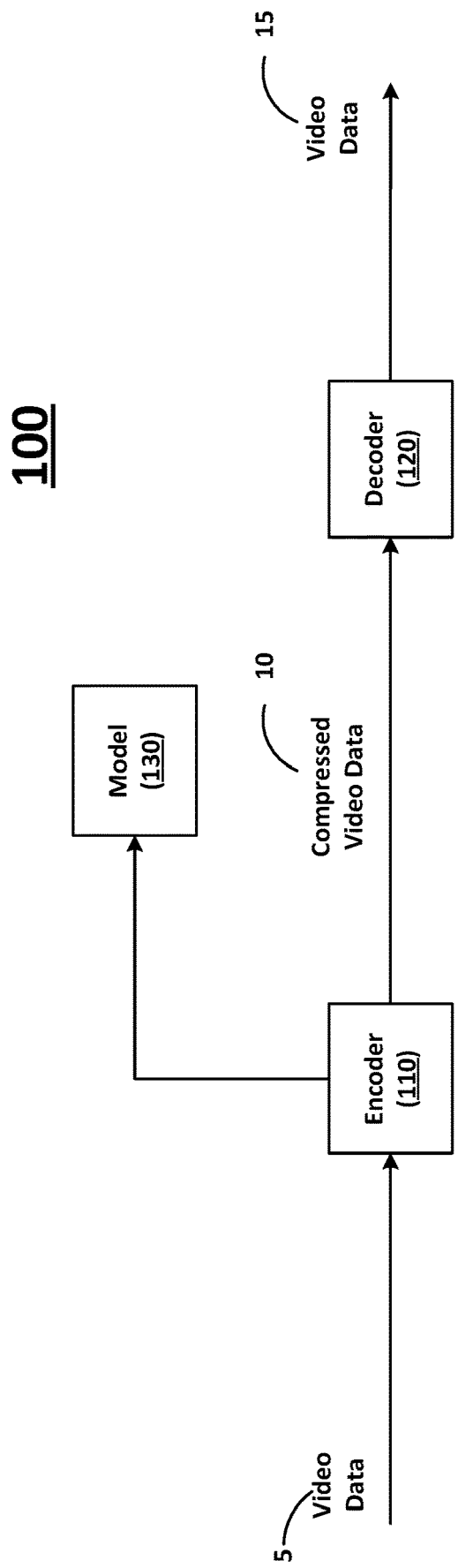
FIG. 1 illustrates a block diagram of a compressive auto-encoder (CAE) system according to at least one example embodiment.

FIG. 1 illustrates a block diagram of a compressive auto-encoder (CAE) system according to at least one example embodiment. As shown in FIG. 1, the CAE system 100 includes an encoder 110, a decoder 120 and a model 130. The encoder 110 can be configured to receive video data 5 and generate compressed video data 10 using a model selected from model 130. The decoder 120 can be configured to receive compressed video data 10 and generate video data 15 using the model selected from model 130. The decoder 120 can be further configured to generate parameters (e.g., based on a decoded image or frame of video) that are communicated to the model 130. The model 130 can be configured to use the parameters to train the selected model (and/or other models) stored in association with the model 130.

Mathematically, the CAE can be defined as having three components: (1) an encoder f, (2) a decoder g, and (3) a probabilistic model Q as $$f: \mathbb{R}^N \to \mathbb{R}^M, g: \mathbb{R}^M \to \mathbb{R}^N, Q: \mathbb{R}^M \to [0,1] \tag{2}$$

The discrete probability distribution defined by Q is used to assign a number of bits to representations based on their frequencies. In other words, Q is used to provide entropy coding. All three components may have parameters used to optimize a tradeoff between using a small number of bits (e.g., high compression and low bandwidth) for an encoded frame of video or an encoded image and having small distortion when the encoded frame of video or encoded image is decoded, such that:

$$\underbrace{-\log_2 Q([f(x)])}_{\text{Number of bits}} + \beta \cdot \underbrace{d(x, g([f(x)]))}_{\text{Distortion}} \tag{3}$$

where, α controls the tradeoff between using a small number of bits for the encoded frame of video or the encoded image and having small distortion when the encoded frame of video or encoded image is decoded. Square brackets indicate quantization through rounding to the nearest integer, and d measures the distortion introduced by coding and decoding the frame of video or the image. The quantized output of the encoder (e.g., compressed video data 10) is the code used to represent an image and is stored losslessly. The main source of information loss is the quantization. Additional information may be discarded by the encoder, and the decoder may not perfectly decode the available information, increasing distortion. Equation (2) cannot be optimized directly using gradient-based techniques, because Q and [•] are non-differentiable.

Q is a discrete function. Therefore, Q cannot be differentiated with respect to Q's argument, which can prevent computing a gradient for the encoder. To solve this problem, a continuous, differentiable approximation can be used. The non-differentiable number of bits can define an upper bound by first expressing the probability distribution Q in terms of a probability density q, such that:

$$Q(z) = \int_{[-0.5, 0.5]^M} q(z+u) du \quad (4)$$

An upper bound of $-\log_2 Q(z)$ or the number of bits is given by:

$$-\log_2 Q(z) = -\log_2 \int_{[-0.5, 0.5]^M} q(z+u) du \leq \int_{[-0.5, 0.5]^M} -\log_2 q(z+u) du \quad (5)$$

An unbiased estimate of the upper bound can be determined or estimated by sampling u from the unit cube $[-0.5, 0.5]^M$. If a differentiable density is used, the estimate will be differentiable in z. Therefore, the estimate can be used to train the model used by the encoder.

Fine-grained control over the number of bits used is achieved in an example implementation by training the auto-encoder (e.g., CAE system 100) for different rate-distortion tradeoffs. This may necessitate training and storing a relatively large number of models. To reduce these processing, memory and time costs, a pre-trained auto-encoder can be fine-tuned for different rates by introducing scale parameters $\lambda \in \mathbb{R}^M$, such that:

$$-\log_2 q([f(x) \circ \lambda] + u) + \beta \cdot d(x, g([f(x) \circ \lambda]/\lambda)) \quad (6)$$

where, ∘ indicates point-wise multiplication (division is also performed point-wise). To reduce the number of trainable scales, the trainable scales may be shared across dimensions. For example, where f and g are convolutional scale parameters that are shared across spatial dimensions but not across channels, an example of learned scale parameters is shown below. For more fine-grained control over bit rates, the optimized scales can be interpolated.

Figure 8:
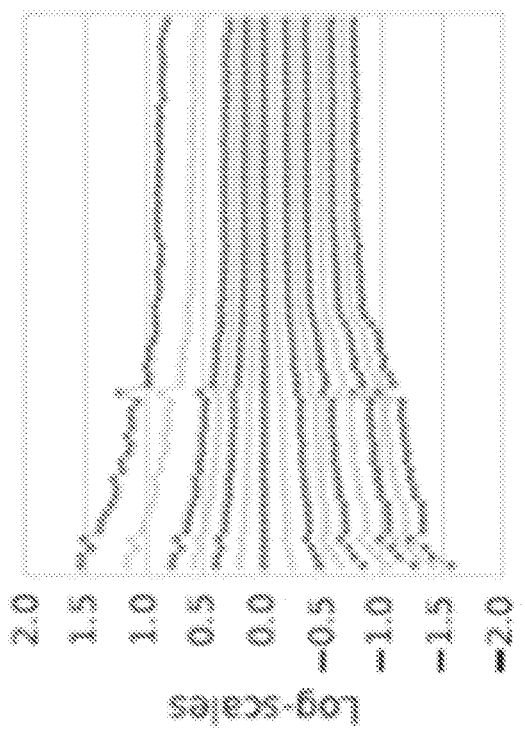
FIG. 8 illustrates scale parameters generated by fine-tuning an example compressive auto-encoder according to at least one example embodiment.

FIG. 8 illustrates a graph of scale parameters generated by fine-tuning an example compressive auto-encoder (dark). More fine-grained control over bit rates can be achieved by interpolating scales (light).

Figure 2:
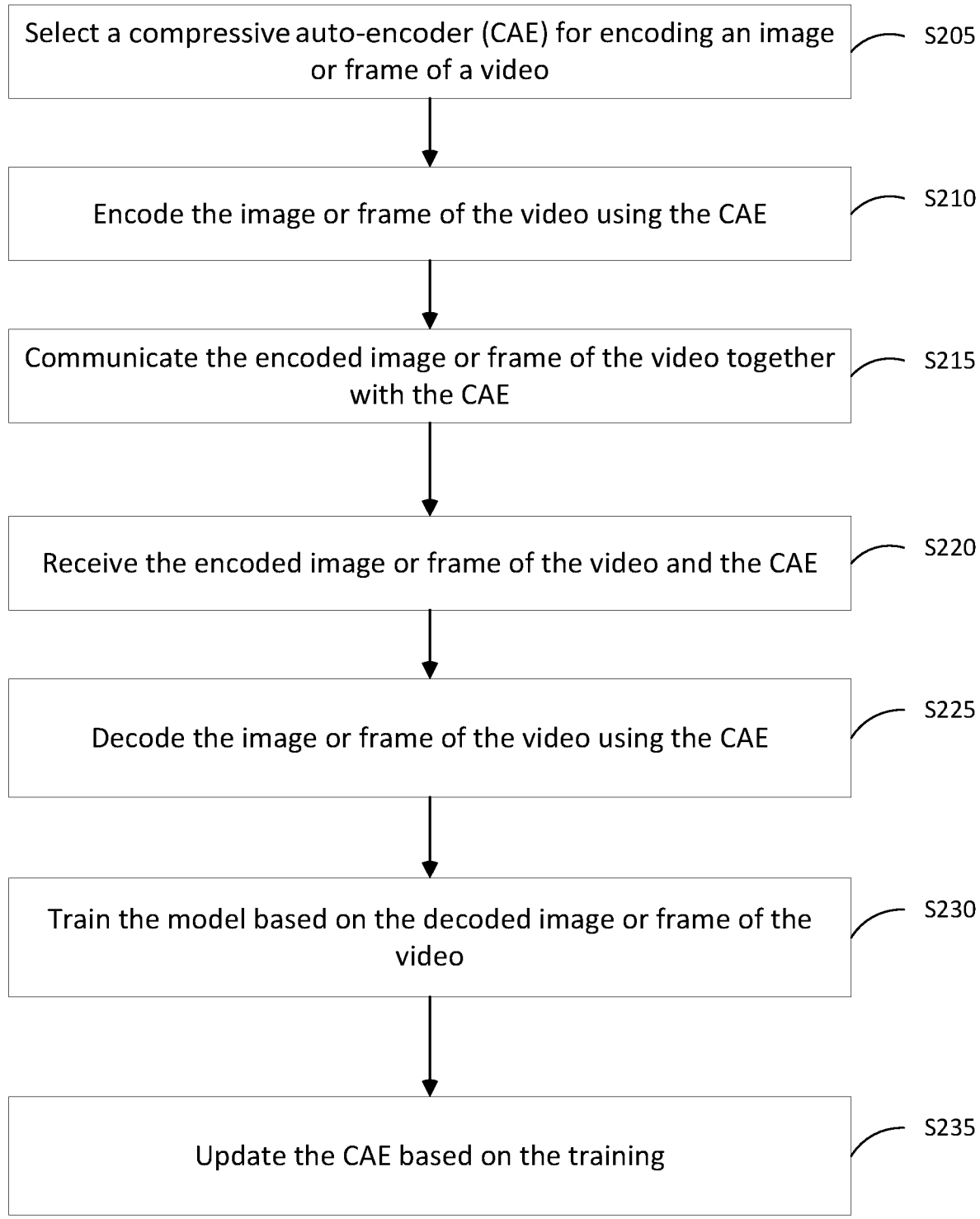
FIG. 2 illustrates a method for encoding an image or frame of video according to at least one example embodiment.
Figure 4:
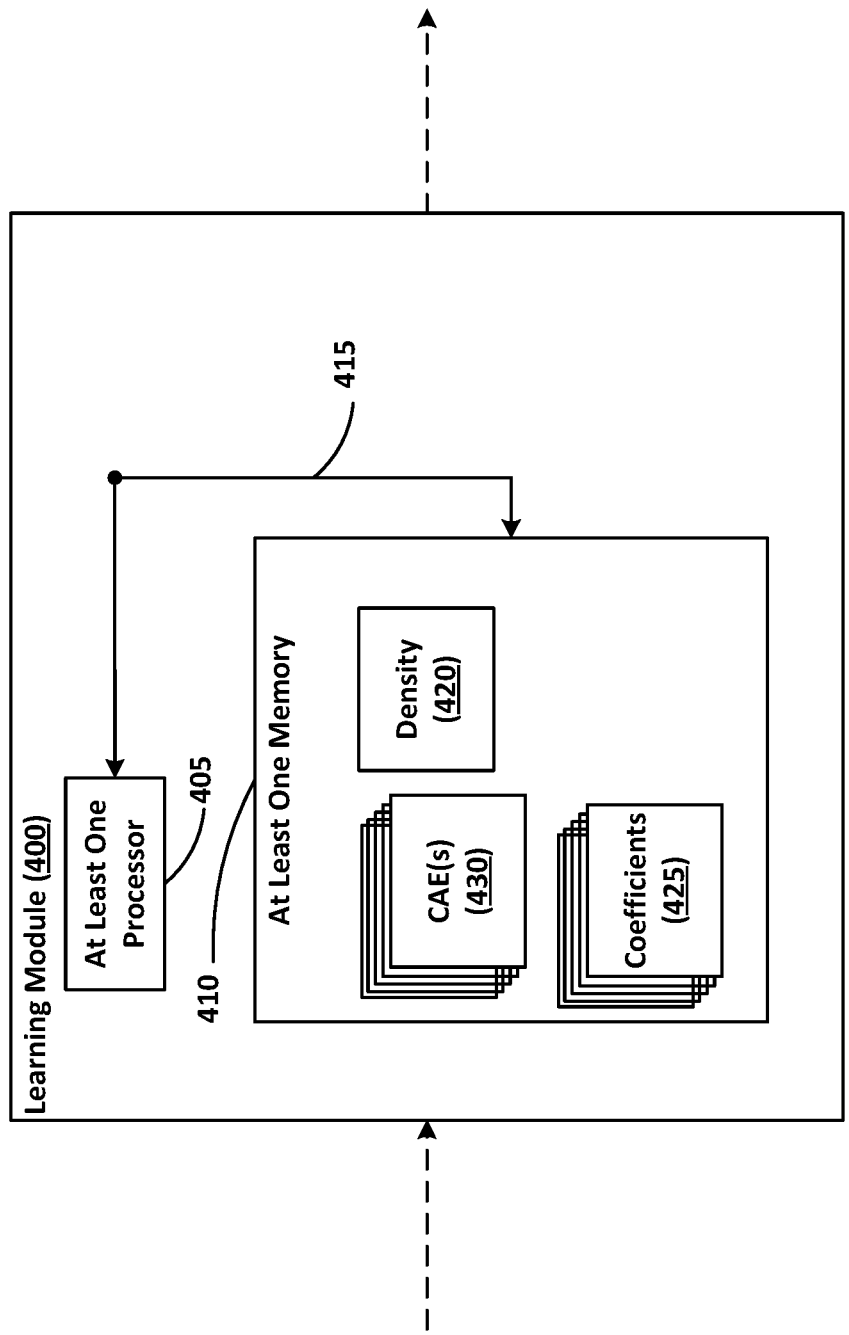
FIG. 4 illustrates a block diagram of learning module system according to at least one example embodiment.
Figure 6A:
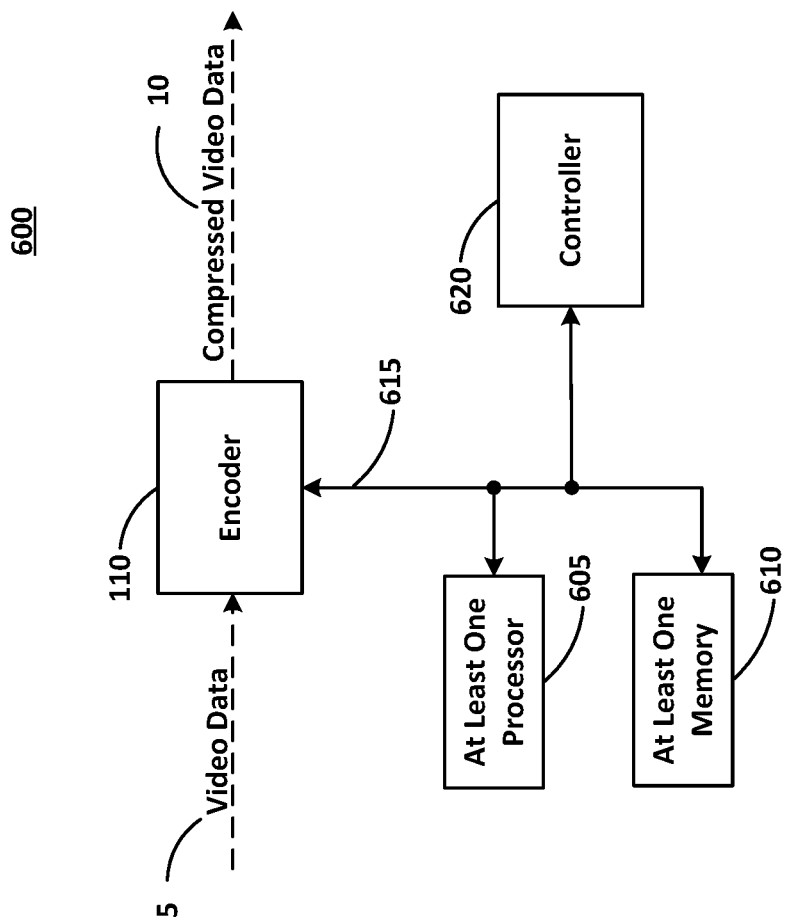
FIG. 6A illustrates a block diagram of an auto-encoder system according to at least one example embodiment.

FIG. 2 illustrates a method for encoding an image or frame of video according to at least one example embodiment. The steps described with regard to FIG. 2 may be performed due to the execution of software code stored in a memory (e.g., at least one memory 410, 610 and/or 660) associated with an apparatus (e.g., as shown in FIGS. 4, 6A and 6B (described below)) and executed by at least one processor (e.g., at least one processor 405, 605 and/or 655) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 2.

As shown in FIG. 2, in step S205 a model for encoding an image or frame of a video is selected. For example, the model can be selected from a memory (e.g., datastore) associated with a device (e.g., the device or a device communicatively coupled to the device). The device can include the model 130. The memory can include a plurality of models. Each of the plurality of models can be trained (or optimized) for a type of image or video. For example, a streaming video of a sporting event can have a different model than a streaming video of a music concert. A vibrant image of a bird, an image of a field of wheat, thumbnails and/or non-natural images each can have a different model. Different sporting events (e.g., baseball, football, swimming, and/or the like) can have different models. Accordingly, the model can be selected from the memory based on a type of image or video.

The model can include model coefficients associated with one or more convolution and/or filter to be applied to the image in order to encode and/or decode the image. The model can be based one or more neural network associated with the one or more convolution and/or filter. Each convolution can have C filters, a K×K mask (K representing a convolution) and a stride or upsample factor. The model coefficients can correspond to one or more of the C filters, the K×K mask and the stride or upsample factor. For example, the K×K mask for one of a plurality of convolution blocks in an encoder can be a 3×3 mask. The 3×3 mask includes nine (9) variables used in performing a convolution on an image. In other words, the 3×3 mask has nine (9) blocks each including a variable. The variables can each be one of the model coefficients.

In step S210 the image or frame of the video is encoded using the model. For example, the image or frame of the video is encoded using a neural network based encoder (e.g., as described with regard to FIG. 3A) to achieve a lossy image compression. The encoder includes a plurality of convolution blocks configured to use the model coefficients associated with the model. For example, the plurality of convolution blocks can be configured to implement a lossy compression algorithm. In other words, the plurality of convolution blocks can be configured to implement a lossy codec based on neural networks, adaptive entropy coding and quantization.

In step S215 the encoded image or frame of the video is communicated together with the model. For example, the encoder (or system including the encoder) can generate at least one data packet including the compressed image or frame of video. The at least one data packet can include a header with the model and/or model coefficients. For example, the model may include a model used to encode (e.g., based on the example shown in FIG. 3A), a model used to decode (e.g., based on the example shown in FIG. 3B) and the corresponding model coefficients.

In step S220 the encoded image or frame of the video and the model is received. For example, a decoder (or system including the decoder) can receive the at least one data packet including the compressed image or frame of video and a header with the model.

In step S225 the image or frame of the video is decoded using the model. For example, the image or frame of the video can be decoded using an algorithm configured to implement the inverse of the lossy compression algorithm (e.g., an inverse algorithm). The algorithm can be a codec based on neural networks using a plurality of convolution blocks. The plurality of convolution blocks can be configured to use the model coefficients associated with the model.

In step S230 the model is trained based on the decoded image or frame of the video. For example, the model can be trained using at least one Independent Gaussian scale mixture (GSM) as described below with regard to FIG. 4. The GSM can use at least one error value associated with decoding the image or frame of the video to train the neural networks on which the model is based. In other words, the GSM can be used modify the model coefficients associated with the model in order to reduce decoding errors. Decoding errors can be associated with a perceived (e.g., by a viewer of the decoded image or frame of video) quality, clip errors (e.g., pixel values outside of a range after decoding), comparisons to an original image and/or the like.

As mentioned above, an auto-encoder uses a lossy compression algorithm in an encoder and an algorithm that is the inverse of the lossy compression algorithm in the decoder. The lossy compression algorithm and the inverse of the lossy compression algorithm can be trained separately or together. However, training the lossy compression algorithm and the inverse of the lossy compression algorithm together can achieve a better output (e.g., decoded image or frame of video) in at least some embodiments. In some embodiments, the goal of training the lossy compression algorithm and the inverse of the lossy compression algorithm is to obtain a small reconstruction error using as few bits as possible.

In an example implementation, a video is streamed from device at a live event to a plurality of remote devices using the techniques described herein. For example, a sporting event (e.g., baseball, football, swimming, and/or the like) is streamed from a device located at the venue holding the sporting event to a plurality of subscriber devices. In this example implementation, the model is trained in real-time. As a result, the quality of the decoded streaming video should improve during the course of the sporting event. In addition, the trained model can be used (or selected for use during) a future sporting event.

In step S235 the model is updated based on the training. For example, the model coefficients associated with the model can be changed in the memory (e.g., datastore) associated with the device (e.g., the device or a device communicatively coupled to the device) that performed the encoding. The model coefficients associated with the model can be changed based on the training.

Figure 3A:
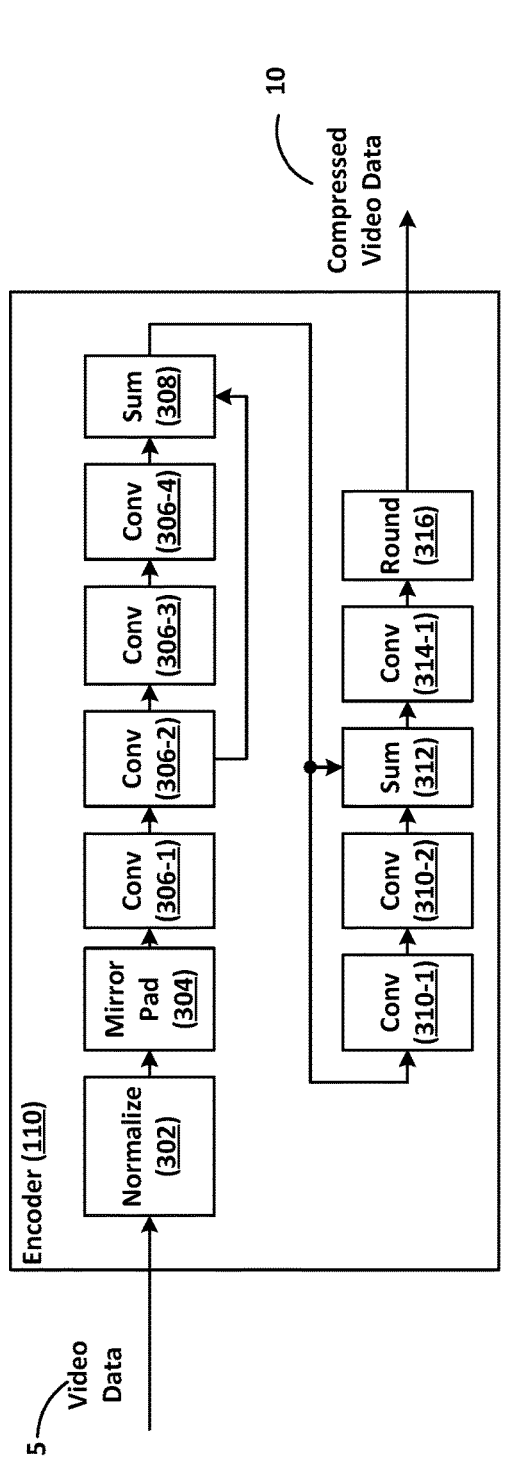
FIG. 3A illustrates a flow diagram of an auto-encoder according to at least one example embodiment.

FIG. 3A illustrates a flow diagram of an encoder 110 according to at least one example embodiment. According to an example implementation, video data 5 (e.g., one or more frame of streaming video, one or more frame of a video, an image or the like) is received by the encoder 110. The video data 5 is then normalized, mirror padded, convolved and rounded. For example, the encoder 110 can perform mirror padding and a fixed pixel-wise normalization on the video data 5. The mirror-padding can be configured to cause the output of the encoder 110 to have a same spatial extent as an n times downsampled image. The normalization can center the distribution of each channel's values and ensure the distribution has approximately a unit variance. The normalized and mirror padded video data is convolved and spatially downsampled while at the same time increasing the number of channels to m. This is followed by additional convolution(s) with m filters. A final convolution is applied where the coefficients are downsampled and the result is rounded to the nearest integer.

As shown in FIG. 3A, the encoder 110 includes a normalize block 302, a mirror pad 304, a plurality of convolution blocks 306-1, 306-2, 306-3, 306-4, 310-1, 310-2, 314-1, a plurality of sum blocks 308, 312 and a round block 316. The normalize block 302 may be configured to center the distribution of a channels' values and ensure each channel has approximately a unit variance. In other words, values within a channel can be normalized to [0, 1]. For example, an input image may have 3 channels or one channel each for red (R), green (G) and blue (B). Typically the value for R, G, B range between 0 and 255. After normalization, the values for R, G, B should range between 0 and 1.

The mirror pad 304 can be configured to pad or add pixels to the input image at the boundary of the image using pixels adjacent to the boundary of the image. For example, if the output of the encoder 110 is to have a same spatial extent as an n times downsampled image, the input image may need to be padded (e.g., made larger). Mirror-padding can include using pixels from the image (as opposed to zero-padding which just adds a number of pixels with a value of R=0, G=0, B=0). The pixels can be selected from a number of adjacent pixels and a mirror image added to the boundary of the input image. For example, the number of pixels for each row and the number of pixels for each column to be added to the input image can be based on the pixel number reduction caused by subsequent convolutions of the image data. The number of pixels for each row and the number of pixels for each column can be used to select pixels beginning with a pixel at the border (at a row or a column) and then moving toward the center of the input image. The selected pixels can then be added as a reflection (e.g., mirrored) onto the corresponding row or column of the input image. In other words, mirror padding is repeatedly flipping image horizontally and vertically (e.g., at each row and column of the image).

The plurality of convolution blocks 306-1, 306-2, 306-3, 306-4, 310-1, 310-2, 314-1 can be configured to convolve or filter the image data using a mask. Each convolution can have C filters, a K×K mask (K representing a convolution) and a stride. In a convolutional neural network context (see FIGS. 5A and 5B) each neuron in the convolutional neural network can represent a filter. Therefore, a convolutional neural network with 8 neurons per layer can have 8 filters using one (1) layer, 16 filters using two (2) layers, 24 filters using three (3) layers . . . 64 filters using 8 layers . . . 128 filters using 16 layers and so forth. A layer can have any number of neurons in the convolutional neural network.

A convolutional neural network can have layers with differing numbers of neurons. The K×K mask can include K columns and K rows. The K×K mask can be a 2×2 mask, a 3×3 mask, a 4×4 mask, 5×5 mask and so forth. Convolution includes centering the K×K mask on a pixel and convolving all of the pixels in the mask and generating a new value for the pixel based on all (e.g., the sum of) the convolution of all of the pixels in the mask. The mask is then moved to a new pixel based on the stride and the convolution is repeated for the new pixel. The stride can be, for example, one (1) or two (2) where a stride of one moves to the next pixel and a stride of two skips a pixel. Each of the plurality of convolution blocks 306-1, 306-2, 306-3, 306-4, 310-1, 310-2, 314-1 can have a different number of C filters, a different number K×K mask and a different stride.

The plurality of sum blocks 308, 312 can be configured to add video data (e.g., pixel by pixel) from convolution stages. The round block 316 can be configured to round the results of the convolved video data to, for example, a nearest integer value. The rounded video data is the compressed video data 10. The compressed video data 10 can be communicated to decoder (e.g., decoder 120) or a system including decoder (e.g., decoder 120).

Figure 3B:
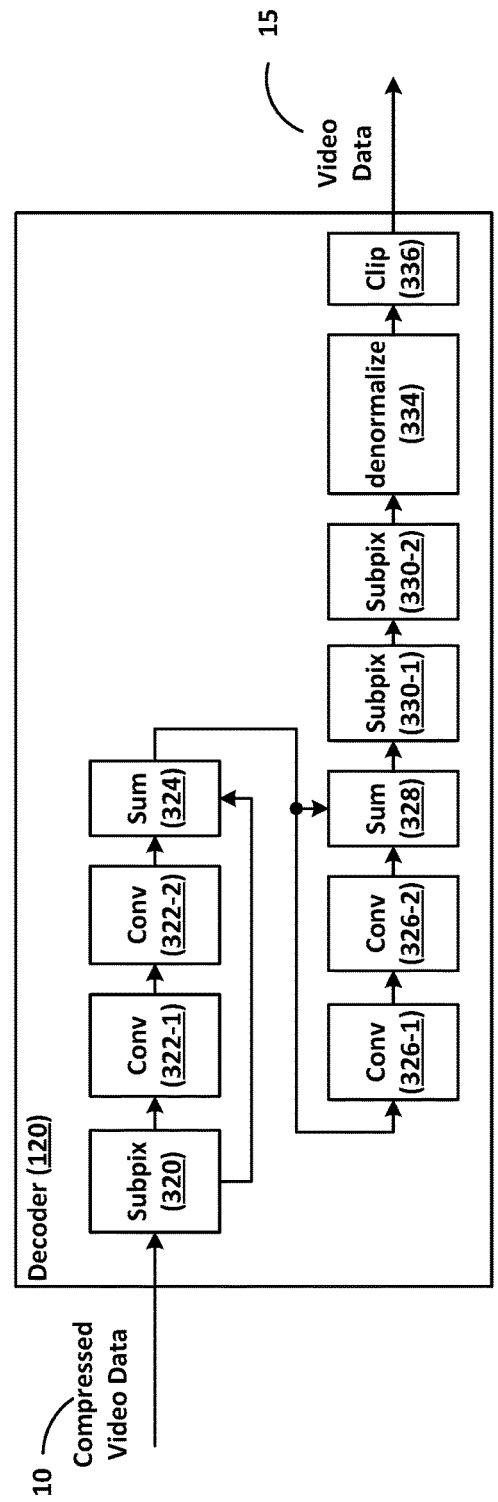
FIG. 3B illustrates a flow diagram of an auto-decoder according to at least one example embodiment.

FIG. 3B illustrates a flow diagram of the decoder 120 according to at least one example embodiment. The decoder 120 can mirror the architecture of the encoder 110. According to an example implementation, compressed video data 10 (e.g., encoded data corresponding to one or more frame of streaming video, one or more frame of a video, an image or the like) is received by the decoder 120. The compressed video data 10 is then convolved using a sub-pixel convolution layer. The sub-pixel convolution layer can include zero-padded convolutions and a reorganization of coefficients resulting in an upsampling of the video data. The reorganization of coefficients can convert a tensor with many channels into a tensor of the same dimensionality but with fewer channels and larger spatial extent. The video data is then convolved, upsampled again using sub-pixel convolution layers in order to upsample the image to the resolution of the original input video (e.g., video data 5). The video data is then denormalized and the resultant pixel values are clipped.

As shown in FIG. 3B, the decoder 120 includes a plurality of sub-pixel convolution blocks 320-1, 330-1 and 330-2, a plurality of convolution blocks 322-1, 322-2, 326-1 and 326-2, a plurality of sum blocks 324, 328, a denormalize block 334 and a clip block 336. The plurality of sub-pixel convolution blocks 320-1, 330-1 and 330-2 may be configured to upsample the compressed video data. The plurality of sub-pixel convolution blocks 320-1, 330-1 and 330-2 may include one or more zero-padded convolution elements and an element configured to reorganize coefficients. In an example implementation, zero padding includes filling zeros in between non-zero pixels and coefficient reorganization can include a convolution with a K×K mask rotated 180 degrees centered at the zero filled pixels.

Each of the one or more zero-padded convolution elements can have C filters, a K×K mask (K representing a convolution) and an upsampling factor. In a convolutional neural network context (see FIGS. 5A and 5B) each neuron in the convolutional neural network can represent a filter. Therefore, a convolutional neural network with 8 neurons per layer can have 8 filters using one (1) layer, 16 filters using two (2) layers, 24 filters using three (3) layers . . . 64 filters using 8 layers . . . 128 filters using 16 layers and so forth. A layer can have any number of neurons in the convolutional neural network.

A convolutional neural network can have layers with differing numbers of neurons. The K×K mask can include K columns and K rows. The K×K mask can be a 2×2 mask, a 3×3 mask, a 4×4 mask, 5×5 mask and so forth. Convolution includes centering the K×K mask on a pixel and convolving all of the pixels in the mask and generating a new value for the pixel based on all (e.g., the sum of) the convolution of all of the pixels in the mask. The mask is then moved to a new pixel based on the stride and the convolution is repeated for the new pixel. The upsampling factor can be, for example, two (2) where an upsampling factor inserts a zero pixel in between two non-zero pixels. The zero filled pixels can be convolved with the K×K mask is rotated such that the coefficients of the K×K mask are used to convolve the zero filled pixels in a different position as compared to the video data pixels.

The plurality of convolution blocks 322-1, 322-2, 326-1 and 326-2 can be configured to convolve or filter the image data using a mask. Each convolution can have C filters, a K×K mask (K representing a convolution) and a stride as discussed above. The plurality of sum blocks 324, 328 can be configured to add video data (e.g., pixel by pixel) from convolution stages.

The denormalize block 334 can be configured to perform the inverse of the normalize block 302. In other words, values within a channel can be denormalized from [0, 1] to [0,255] for red (R), green (G) and blue (B). After denormalization, the values for R, G, B should range between 0 and 255. However, some values for R, G, B may be outside of this range. Therefore, clip block 336 can be configured to clip any value for R, G, B above 255 to 255 and any value below 0 to 0. The output is the video data 15. Video data 15 is the decompressed (or decoded) video/image corresponding to the input video/image associated with video data 5.

However, with respect to training the convolutional neural network (discussed below, the gradient (inverse of the rounding function) of the clipping function can be 1 outside the clipped range (e.g., [−1, 256]. This can ensure that an associated training signal (e.g., for training the auto-encoder for the current video/image (or type of video/image) is non-zero even when the decoded pixels are outside this range. For example, the gradient of the clipping operation can be defined to be constant, e.g., $$\frac{d}{d\hat{x}}\text{clip}_{0,255}(\hat{x}) := 1 \qquad (7)$$

Using equation 7, the effect of equation 6 on the gradients of a squared loss is shown by:

$$\frac{d}{d\hat{x}}(\text{clip}_{0,255}(\hat{x}) - x)^2 = 2(\text{clip}_{0,255}(\hat{x}) - x)\frac{d}{d\hat{x}}\text{clip}_{0,255}(\hat{x}) \qquad (8)$$

If $\hat{x}$ is larger than 255, then without redefinition of the derivative, the error signal will be 0 and not helpful for training. In other words, clipping can cause the value to be within the expected range (e.g., [0, 255]) thus eliminating any error that can be used in a training process. Without any clipping, the error signal will depend on the value of $\hat{x}$, even though any value above 255 will have the same effect on the loss at training time. On the other hand, using clipping but a different signal in the training pass yields an error signal that is proportional to the error that would also be incurred at during decoding.

Now referring to FIGS. 3A and 3B, an example implementation can include a model having model coefficients where convolution block 306-1 is configured to perform a 64×5×5/2 convolution model or 5×5 convolutions with 64 filters and a stride of 2; convolution block 306-2 is configured to perform a 128×5×5/2 convolution model or 5×5 convolutions with 128 filters and a stride of 2; convolution block 306-3 is configured to perform a 128×3×3 convolution model or 3×3 convolutions with 128 filters and a stride of 1; convolution block 306-4 is configured to perform a 128×3×3 convolution model or 3×3 convolutions with 128 filters and a stride of 1; convolution block 310-1 is configured to perform a 128×3×3 convolution model or 3×3 convolutions with 128 filters and a stride of 1; convolution block 310-2 is configured to perform a 128×3×3 convolution model or 3×3 convolutions with 128 filters and a stride of 1; and convolution block 314-1 is configured to perform a 96×5×5/2 convolution model or 5×5 convolutions with 96 filters and a stride of 2.

Further, sub-pixel convolution block 320-1 is configured to perform a 512×3×3/2 convolution model or 3×3 convolutions with 512 filters and a upsample factor of 2; sub-pixel convolution block 330-1 is configured to perform a 256×3×3/2 convolution model or 3×3 convolutions with 256 filters and a upsample factor of 2; sub-pixel convolution block 330-2 is configured to perform a 12×3×3/2 convolution model or 3×3 convolutions with 12 filters and a upsample factor of 2; convolution block 322-1 is configured to perform a 128×3×3 convolution model or 3×3 convolutions with 128 filters and a stride of 1; convolution block 322-2 is configured to perform a 128×3×3 convolution model or 3×3 convolutions with 128 filters and a stride of 1; convolution block 326-1 is configured to perform a 128×3×3 convolution model or 3×3 convolutions with 128 filters and a stride of 1;

and convolution block 326-2 is configured to perform a 128×3×3 convolution model or 3×3 convolutions with 128 filters and a stride of 1. Although an example implementation is described with regard to FIGS. 3A and 3B with the above model coefficients, example embodiments are not limited thereto.

FIG. 4 illustrates a block diagram of a learning module system according to at least one example embodiment. The learning module system 400 may be, or include, at least one computing device and can represent virtually any computing device configured to perform the methods described herein. As such, the learning module system 400 can include various components which may be utilized to implement the techniques described herein, or different or future versions thereof. By way of example, the learning module system 400 is illustrated as including at least one processor 405, as well as at least one memory 410 (e.g., a non-transitory computer readable medium).

As shown in FIG. 4, the learning module system 400 includes the at least one processor 405, the at least one memory 410 and a GSM 420. The at least one processor 405, the at least one memory 410, and the GSM 420 are communicatively coupled via bus 415.

The at least one processor 405 may be utilized to execute instructions stored on the at least one memory 410, so as to thereby implement the various features and functions described herein, or additional or alternative features and functions. The at least one processor 405 and the at least one memory 410 may be utilized for various other purposes. In particular, the at least one memory 410 can represent an example of various types of memory and related hardware and software which might be used to implement any one of the modules described herein.

The at least one memory 410 may be configured to store data and/or information associated with the learning module system 400. For example, the at least one memory 410 may be configured to store a plurality of models 130 and a plurality of model coefficients 425. For example, the at least one memory 410 may be configured to store code segments that when executed by the at least one processor 405 cause the at least one processor 405 to select and communicate one or more of the plurality of model coefficients 435. For example, the at least one memory 410 may be configured to store code segments that when executed by the at least one processor 405 cause the at least one processor 405 to receive information used by the learning module 400 system to generate new model coefficients 435 and/or update existing model coefficients 435. For example, the at least one memory 410 may be configured to store code segments that when executed by the at least one processor 405 cause the at least one processor 405 to receive information used by the learning module 400 system to generate a new model 130 and/or update an existing model 130.

With reference to the GSM 420, an Independent Gaussian Scale Mixture (GSM) or probabilistic density function can be used to model the distribution of coefficients and estimate the bit rate for models used in the auto-encoder. An example GSM is:

$$\log_2 q(z+u) = \Sigma_{i,j,k} \log_2 \Sigma_s \pi_{ks} \aleph(z_{kij} + u_{kij}; 0, \sigma_{ks}^2) \quad (9)$$

where i and j iterate over spatial positions, and k iterates over channels of the coefficients for a single image z. GSMs can be useful building blocks for modeling filter responses of natural images. Log-weights and log-precisions can be optimized rather than weights and variances so that the GSM can be parameterized for use with gradient based methods. The leptokurtic nature of GSMs can indicate that the rate term encourages sparsity of coefficients. According to an example implementation, the coefficients can be trained using an incremental technique. This is done by introducing an additional binary mask m:

$$-\log_2 q([f(x)] \circ m + u) + \beta \cdot d(x, g([f(x)] \circ m)) \quad (9)$$

According to the example implementation, all but two (2) entries of a binary mask can be initialized with a value of zero. Neural networks are then trained until performance improvements approach or are below a threshold. Then, another coefficient is enabled by setting an entry value of the binary mask to 1. After all coefficients have been enabled, the learning rate is reduced from an initial value of $10^{-4}$ to $10^{-5}$. After a model has been trained for a fixed rate-distortion trade-off ($\beta$), scale parameters (Equation 6) can be introduced and fine tuned for other values of $\beta$ while keeping all other parameters fixed. In an example implementation, an initial learning rate of $10^{-3}$ can be used and continuously decreased by a factor of $\tau^K/(\tau+t)^K$, where t is the current number of updates performed, $\kappa=0.8$, and $\tau=1000$. Scales can be optimized for 10,000 iterations. Interpolation between scales can be optimized for nearby rate-distortion tradeoffs for fine-grained control over the bit rates.

Figures 5A, 5B:
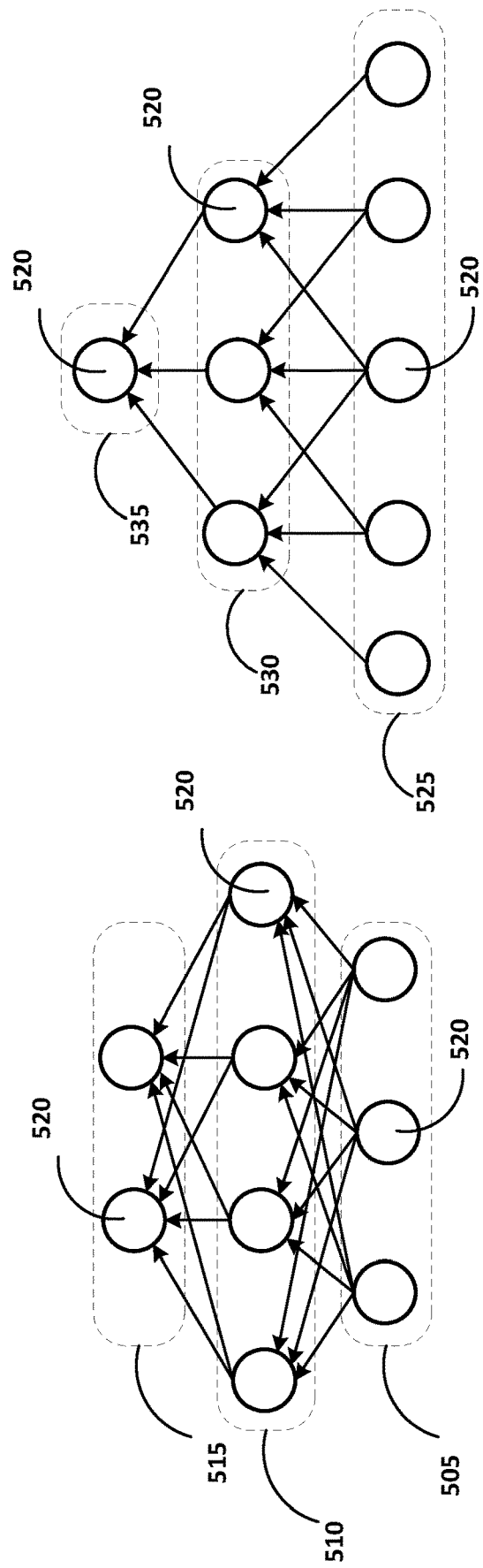
FIG. 5A illustrates layers in a convolutional neural network with no sparsity constraints.
FIG. 5B illustrates layers in a convolutional neural network with sparsity constraints.

FIG. 5A illustrates layers in a convolutional neural network with no sparsity constraints. FIG. 5B illustrates layers in a convolutional neural network with sparsity constraints. An example implementation of a layered neural network is shown in FIG. 5A as having three layers 505, 510, 515. Each layer 505, 510, 515 can be formed of a plurality of neurons 520. No sparsity constraints have been applied to the implementation illustrated in FIG. 5A, therefore all neurons 520 in each layer 505, 510, 515 are networked to all neurons 520 in any neighboring layers 505, 510, 515. The neural network shown in FIG. 5A is not computationally complex because of the small number of neurons 520 and layers 505, 510, 515. However, the arrangement of the neural network shown in FIG. 5A may not scale up to a larger network size (e.g., the connections between neurons/layers) easily as the computational complexity becomes large as the size of the network scales and scales in a non-linear fashion because of the density of connections.

Where neural networks are to be scaled up to work on inputs with a relatively high number of dimensions, it can therefore become computationally complex for all neurons 520 in each layer 505, 510, 515 to be networked to all neurons 520 in the one or more neighboring layers 505, 510, 515. An initial sparsity condition can be used to lower the computational complexity of the neural network, for example when the neural network is functioning as an optimization process, by limiting the number of connection between neurons and/or layers thus enabling a neural network approach to work with high dimensional data such as images.

An example of a neural network is shown in FIG. 5B with sparsity constraints, according to at least one embodiment. The neural network shown in FIG. 5B is arranged so that each neuron 520 is connected only to a small number of neurons 520 in the neighboring layers 525, 530, 535 thus creating a neural network that is not fully connected and which can scale to function with, higher dimensional data— for example as an optimization process for video. The smaller number of connections in comparison with a fully networked neural network allows for the number of connections between neurons to scale in a substantially linear fashion.

Alternatively, in some embodiments neural networks can be use that are fully connected or not fully connected but in different specific configurations to that described in relation to FIG. 5B.

Further, in some embodiments, convolutional neural networks are used, which are neural networks that are not fully connected and therefore have less complexity than fully connected neural networks. Convolutional neural networks can also make use of pooling or max-pooling to reduce the dimensionality (and hence complexity) of the data that flows through the neural network and thus this can reduce the level of computation required. In some embodiments, various approaches to reduce the computational complexity of convolutional neural networks can be used such as the winograd algorithm or low-rank matrix approximations.

Machine learning is the field of study where a computer or computers learn to perform classes of tasks using the feedback generated from the experience or data gathered that the machine learning process acquires during computer performance of those tasks. Typically, machine learning can be broadly classed as supervised and unsupervised approaches, although there are particular approaches such as reinforcement learning and semi-supervised learning which have special rules, techniques and/or approaches. Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabeled data sets. Reinforcement learning is concerned with enabling a computer or computers to interact with a dynamic environment, for example when playing a game or driving a vehicle. Various hybrids of these categories are possible, such as "semi-supervised" machine learning where a training data set has only been partially labelled. For unsupervised machine learning, there is a range of possible applications such as, for example, the application of computer vision techniques to image processing or video encoding.

Unsupervised machine learning is typically applied to solve problems where an unknown data structure might be present in the data. As the data is unlabeled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalized function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features (which can result in too many dimensions being considered by the machine learning process during training, and could also mean that the machine learning process does not converge to good solutions for all or specific examples). The user must also determine the desired structure of the learned or generalized function, for example whether to use support vector machines or decision trees.

The use of unsupervised or semi-supervised machine learning approaches are sometimes used when labelled data is not readily available, or where the system generates new labelled data from unknown data given some initial seed labels.

Current training approaches for most machine learning algorithms can take significant periods of time, which delays the utility of machine learning approaches and also prevents the use of machine learning techniques in a wider field of potential application.

FIG. 6A illustrates a video encoder system according to at least one example embodiment. As shown in FIG. 6A, the video encoder system 600 includes the at least one processor 605, the at least one memory 610, a controller 620, and the encoder 110. The at least one processor 605, the at least one memory 610, the controller 620, and the video encoder 625 are communicatively coupled via bus 615.

The at least one processor 605 may be utilized to execute instructions stored on the at least one memory 610 (e.g., non-transitory computer readable medium), so as to thereby implement the various features and functions described herein, or additional or alternative features and functions. The at least one processor 605 and the at least one memory 610 may be utilized for various other purposes. In particular, the at least one memory 610 can represent an example of various types of memory and related hardware and software which might be used to implement any one of the modules described herein.

The at least one memory 610 may be configured to store data and/or information associated with the video encoder system 600. For example, the at least one memory 610 may be configured to store codecs associated with encoding video. For example, the video encoder system 600 may be an element of a larger system (e.g., a server, a personal computer, a mobile device, and the like). Therefore, the at least one memory 610 may be configured to store data and/or information associated with other elements (e.g., image/video serving, web browsing or wired/wireless communication) within the larger system.

The controller 620 may be configured to generate various control signals and communicate the control signals to various blocks in video encoder system 600. The controller 620 may be configured to generate the control signals to implement the techniques described herein. The controller 620 may be configured to control the encoder 110 to encode an image, a sequence of images, a video frame, a video sequence, and the like according to example embodiments.

The encoder 110 may be configured to receive a video data 5 and output compressed (e.g., encoded) video data 10.

The encoder 110 may convert the video data 5 into discrete video frames. The video data 5 may also be an image, accordingly, the compressed (e.g., encoded) video data 10 may also be compressed image data.

The compressed video data 10 may represent the output of the encoder system 600. For example, the compressed video data 10 may represent an encoded video frame (or an encoded image). For example, the compressed video data 10 may be ready for transmission to a receiving device (not shown). For example, the compressed video data 10 may be transmitted to a system transceiver (not shown) for transmission to the receiving device.

The at least one processor 605 may be configured to execute computer instructions associated with the controller 620 and/or the encoder 110. The at least one processor 605 may be a shared resource. For example, the video encoder system 600 may be an element of a larger system (e.g., a mobile device). Therefore, the at least one processor 605 may be configured to execute computer instructions associated with other elements (e.g., image/video serving, web browsing or wired/wireless communication) within the larger system.

In the example of FIG. 6B, a video decoder system 650 may be at least one computing device and can represent virtually any computing device configured to perform the methods described herein. As such, the video decoder system 650 can include various components which may be utilized to implement the techniques described herein, or different or future versions thereof. By way of example, the video decoder system 650 is illustrated as including at least one processor 655, as well as at least one memory 660 (e.g., a computer readable storage medium).

Thus, the at least one processor 655 may be utilized to execute instructions stored on the at least one memory 660 (e.g., non-transitory computer readable medium), so as to thereby implement the various features and functions described herein, or additional or alternative features and functions. The at least one processor 655 and the at least one memory 660 may be utilized for various other purposes. In particular, the at least one memory 660 can represent an example of various types of memory and related hardware and software which might be used to implement any one of the modules described herein. According to example embodiments, the video encoder system 600 and the video decoder system 650 may be included in a same larger system (e.g., a personal computer, a mobile device and the like). According to example embodiments, video decoder system 650 may be configured to implement the reverse or opposite techniques described with regard to the video encoder system 600.

The at least one memory 660 may be configured to store data and/or information associated with the video decoder system 650. For example, the at least one memory 610 may be configured to store codecs associated with decoding encoded video data. The at least one memory 660 may be a shared resource. For example, the video decoder system 650 may be an element of a larger system (e.g., a personal computer, a mobile device, and the like). Therefore, the at least one memory 660 may be configured to store data and/or information associated with other elements (e.g., web browsing or wireless communication) within the larger system.

The controller 670 may be configured to generate various control signals and communicate the control signals to various blocks in video decoder system 650. The controller 670 may be configured to generate the control signals in order to implement the video decoding techniques described herein. The controller 670 may be configured to control the decoder 120 to decode a video frame according to example embodiments. The controller 670 may be configured to generate control signals corresponding to decoding video.

The decoder 120 may be configured to receive a compressed (e.g., encoded) video data 10 input and output a video data 15. The decoder 120 may convert discrete video frames of the compressed video data 10 into a video stream (as the video data 15). The compressed (e.g., encoded) video data 10 may also be compressed image data, accordingly, the video data 15 may also be an image.

The at least one processor 655 may be configured to execute computer instructions associated with the controller 670 and/or the decoder 120. The at least one processor 655 may be a shared resource. For example, the video decoder system 650 may be an element of a larger system (e.g., a personal computer, a mobile device, and the like). Therefore, the at least one processor 655 may be configured to execute computer instructions associated with other elements (e.g., web browsing or wireless communication) within the larger system.

Figure 7A:
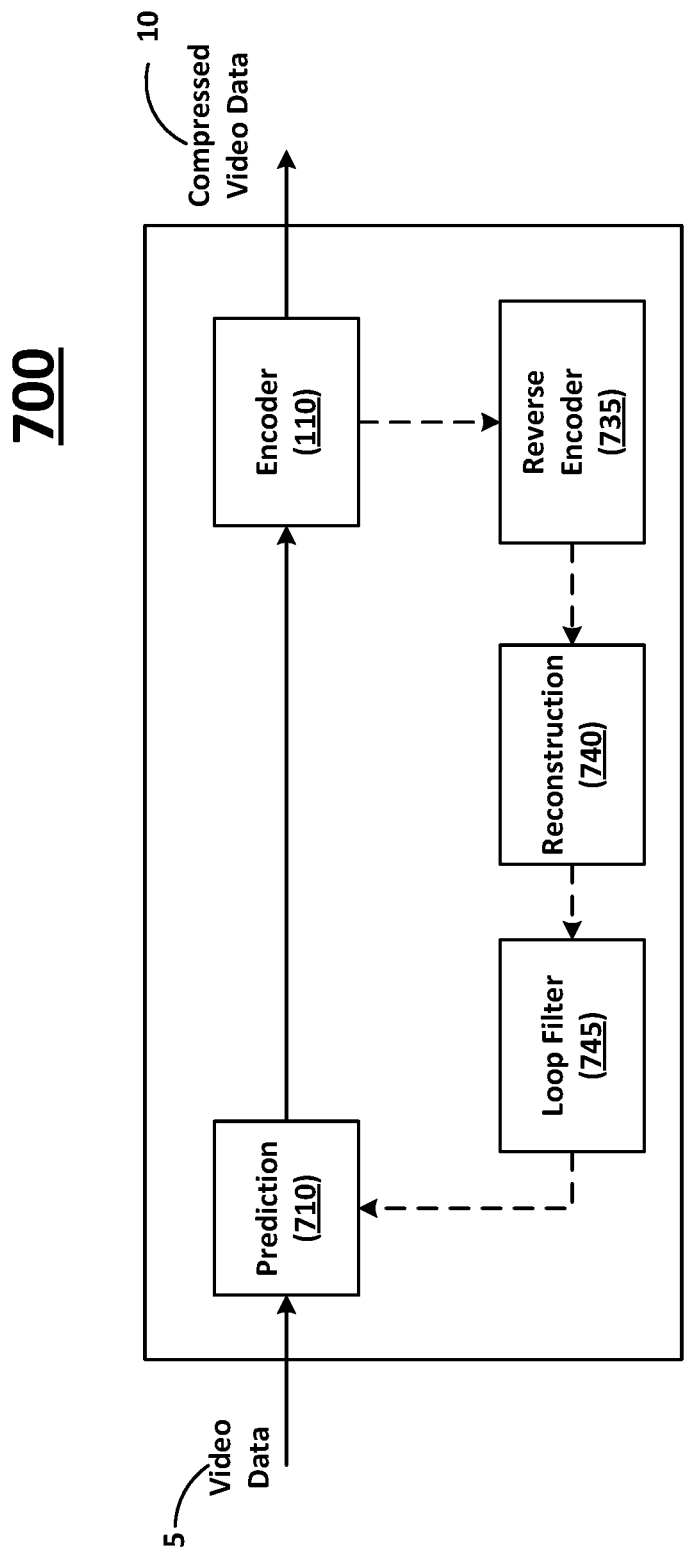
FIG. 7A illustrates a flow diagram for a video encoder system according to at least one example embodiment.

FIG. 7A illustrates a flow diagram for a video encoder system according to at least one example embodiment. As shown in FIG. 7A, the video encoder system 700 includes a prediction block 710, the encoder 110, a reverse encoder 735, a reconstruction block and a loop filter 745. The example illustrated in FIG. 7A shows an implementation where the encoder 110 replaces elements within a typical video encoder system. For example, the encoder 110 can replace transformation (e.g., arithmetic and/or discrete cosign transform (DCT)), quantization and/or entropy encoding as typically performed by a video encoder. Other structural variations of video encoder 625 can be used to encode input video data 5. As shown in FIG. 7A, dashed lines represent a reconstruction path amongst the several blocks and solid lines represent a forward path amongst the several blocks.

Each of the aforementioned blocks may be executed as software code stored in a memory (e.g., at least one memory 610) associated with a video encoder system (e.g., as shown in FIG. 6A) and executed by at least one processor (e.g., at least one processor 605) associated with the video encoder system 700. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the prediction block 710 and/or the reconstruction block 740.

The prediction block 710 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the encoder 110. Inter-frame prediction relates to predicting the pixel values in a block of a picture relative to data of a previously coded picture.

The reverse encoder 735 may be configured to decode the output of the encoder 110 using techniques similar to those described above with regard to the decoder 120. Thus the reverse encoder 735 will not be described further. Further, the output of the reverse encoder 735 may be used as input to the model 130. At the reconstruction block 740, the prediction block that was predicted at the prediction block 710 can be added to the derivative residual to create a reconstructed block. A loop filter 745 can then be applied to the reconstructed block to reduce distortion such as blocking artifacts.

Figure 7B:
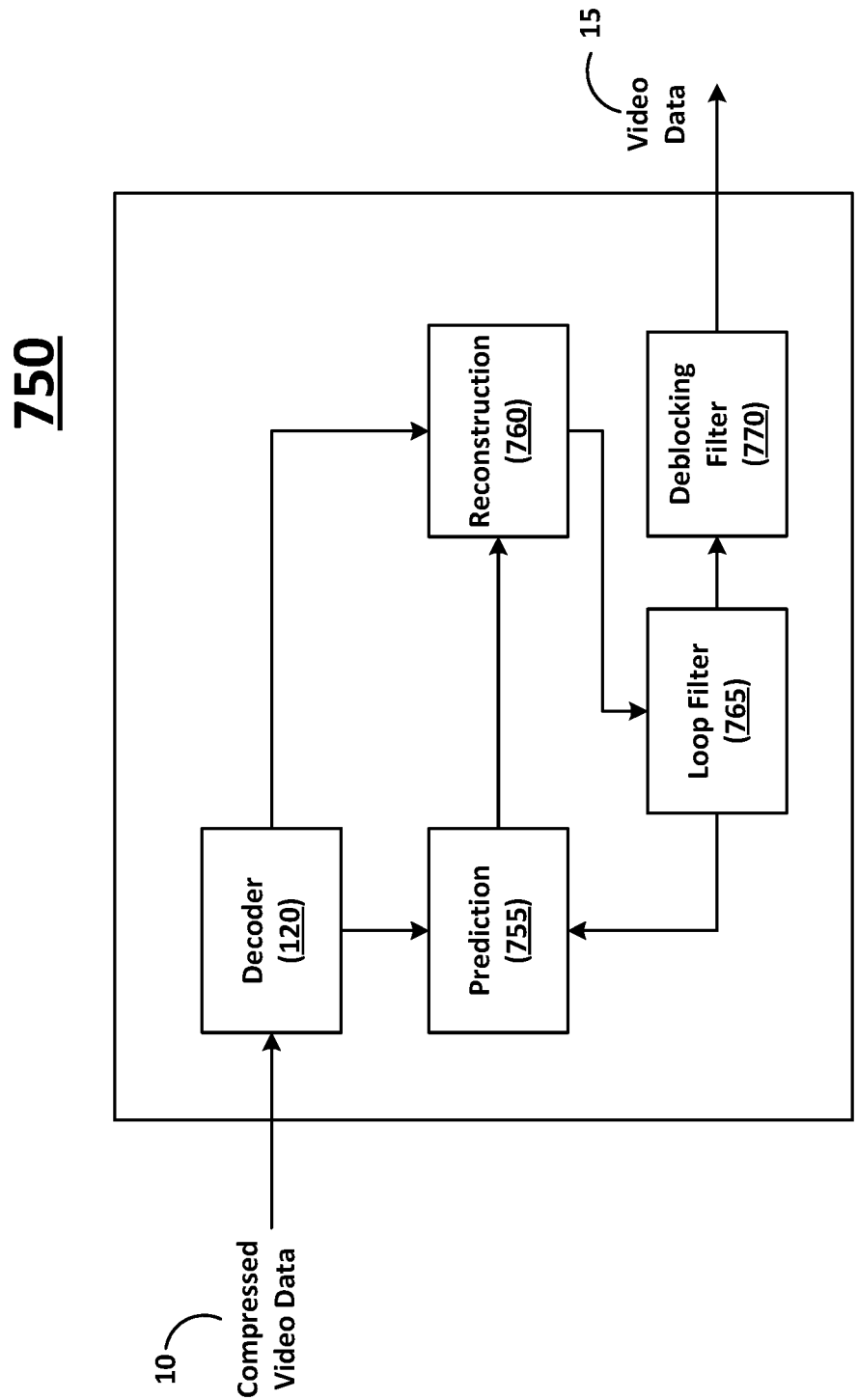
FIG. 7B illustrates a flow diagram for a video decoder system according to at least one example embodiment.

FIG. 7B illustrates a flow diagram for a video decoder system according to at least one example embodiment. The example illustrated in FIG. 7B shows an implementation where the decoder 120 replaces elements within a typical video decoder system. For example, the decoder 120 can replace inverse transformation (e.g., arithmetic and/or discrete cosign transform (DCT)), inverse quantization and/or entropy decoding as typically performed by a video decoder. Video decoder system 750, similar to the reconstruction path of the video encoder system 700 discussed previously, includes an decoder 120, a reconstruction block 760, a loop filter block 765, a prediction block 755, and a deblocking filter block 770.

Using header information decoded from the compressed video data 10, video decoder system 750 can use prediction block 755 to create the same prediction block as was created in the video encoder system 700. The prediction block 755 can be added to the derivative residual to create reconstructed video data by the reconstruction block 760. The loop filter block 765 can be applied to the reconstructed video data to reduce blocking artifacts. Deblocking filter block 770 can be applied to the reconstructed block to reduce blocking distortion, and the result is output as video data 15.

While example embodiments described above may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. An auto-encoder comprising:
an encoder configured to:
receive video data to be compressed,
select a model from a plurality of models based on the video data to be compressed, the model being based on at least one neural network, the at least one neural network configured to implement a lossy compression algorithm, the at least one neural network having been trained based on a type of the video data to be compressed,
generate compressed video data using the selected model,
generate at least one first parameter based on the compressed video data, and
communicate the compressed video data and the model to at least one device configured to decode the compressed video data using an inverse algorithm based on the lossy compression algorithm;
a decoder configured to:
generate decoded video data based on the compressed video data using the inverse algorithm and the model,
generate at least one second parameter based on the decoded video data, and
train the model using the at least one first parameter and the at least one second parameter.

2. The auto-encoder of claim 1, wherein the encoder is configured to quantize the compressed video data using rounding.

3. The auto-encoder of claim 1, wherein the encoder is configured to downsample the compressed video data using a stride in a convolution.

4. The auto-encoder of claim 1, wherein the decoder is configured to upsample the compressed video data using zero-padding and reorganization of coefficients in a mask used in a convolution.

5. The auto-encoder of claim 1, wherein the encoder is configured to use a continuous, differentiable approximation of a probability distribution to assign a number of bits to a representation based on a frequency of the representation.

6. The auto-encoder of claim 1, wherein an independent Gaussian Scale Mixture (GSM) is used to model a distribution of coefficients and estimate a bit rate for the model used in the auto-encoder.

7. The auto-encoder of claim 1, wherein
model coefficients associated with the model are trained using incremental training, and
the incremental training uses a binary mask.

8. The auto-encoder of claim 1, wherein model coefficients associated with the model correspond to elements in a mask used in a convolution.

9. The auto-encoder of claim 1, wherein the encoder is further configured to perform at least one of intra-frame prediction and inter-frame prediction.

10. A method comprising:
receiving video data to be compressed,
selected a model from a plurality of models based on the video data to be compressed, the model being based on at least one neural network, the at least one neural network configured to implement a lossy compression algorithm, the at least one neural network having been trained based on a type of the video data to be compressed,
generating first compressed video data using the selected model;
generating at least one first parameter based on the compressed video data;
communicating the compressed video data and the model to at least one device configured to decode the compressed video data using an inverse algorithm based on the lossy compression algorithm;
generating decoded video data based on the compressed video data using the inverse algorithm and the model;
generating at least one second parameter based on the decoded video data;

training the model using the at least one first parameter and the at least one second parameter; and generating second compressed video data using the trained model.

11. The method of claim 10, wherein the compressed video data is quantized using rounding.

12. The method of claim 10, wherein the compressed video data is downsampled using a stride in a convolution.

13. The method of claim 10, wherein the compressed video data is upsampled using zero-padding and reorganization of coefficients in a mask used in a convolution.

14. The method of claim 10, wherein a continuous, differentiable approximation of a probability distribution is used to assign a number of bits to a representation based on a frequency of the representation.

15. The method of claim 10, wherein an independent Gaussian Scale Mixture (GSM) is used to model a distribution of coefficients and to estimate a bit rate for the model.

16. The method of claim 10, wherein model coefficients associated with the model are trained using incremental training, and the incremental training uses a binary mask.

17. The method of claim 10, wherein model coefficients associated with the model correspond to elements in a mask used in a convolution.

18. The method of claim 10, further comprising at least one of:

performing intra-frame prediction on input video data; and performing inter-frame prediction on the input video data.

19. The method of claim 10, wherein the model is selected based on a type of image or video to be encoded.

20. A non-transitory computer readable medium having code segments stored thereon, the code segments, when executed by a processor cause the processor to:

receive video data to be compressed;

select a model from a plurality of models based on the video data to be compressed, the model being based on at least one neural network, the at least one neural network configured to implement a lossy compression algorithm, the at least one neural network having been trained based on a type of the video data to be compressed;

generate first compressed video data using the selected model;

generate at least one first parameter based on the compressed video data;

communicate the compressed video data and the model to at least one device configured to decode the compressed video data using an inverse algorithm based on the lossy compression algorithm;

generate decoded video data based on the compressed video data using the inverse algorithm and the model;

generate at least one second parameter based on the decoded video data;

train the model using the at least one first parameter and the at least one second parameter; and generate second compressed video data using the trained model.

* * * * *